UNITED STATES PATENT OFFICE

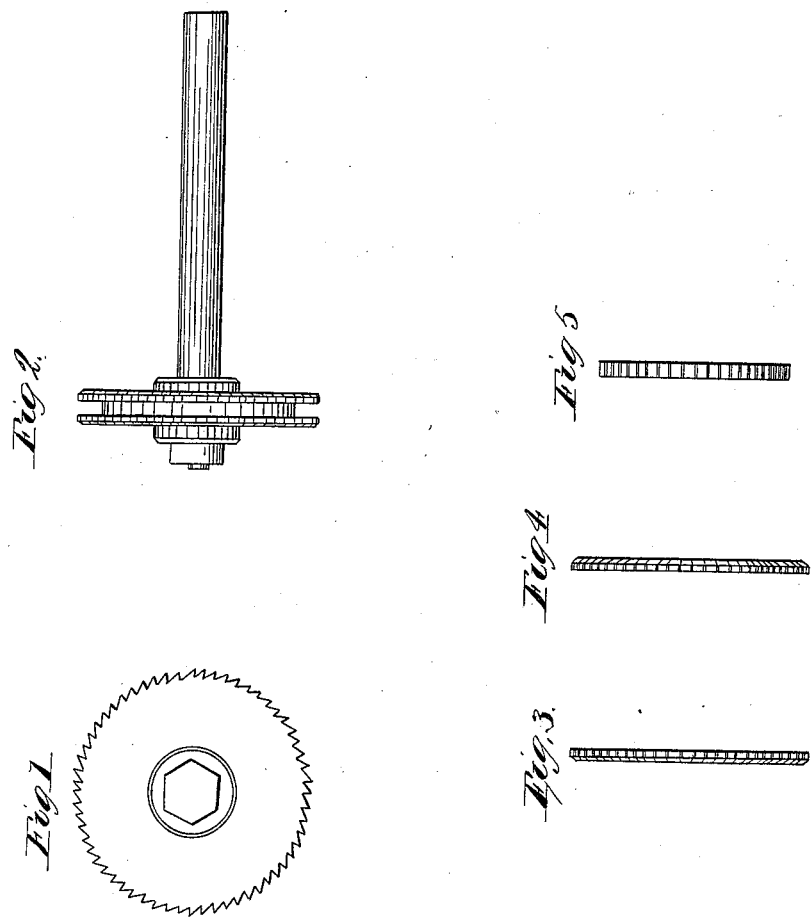

D. H. STEPHENS, OF RIVERTON, CONNECTICUT.

IMPROVEMENT IN TOOLS FOR MAKING TENONS.

Specification forming part of Letters Patent No. 59,472, dated November 6, 1866.

*To all whom it may concern:*

Be it known that I, D. H. STEPHENS, of Riverton, in the county of Litchfield and State of Connecticut, have invented a new and Improved Tenoning-Tool; and I do hereby declare that the following is a full, clear, and exact description of the construction and operation of the same, reference being had to the annexed drawings, making a part of this specification, in which—

Figure 1 is an end view; Fig. 2, a side view. Figs. 3 and 4 show the outside cutters, and Fig. 5 the inside cutter or saw.

The object of this improvement is to cut the tenon on the end of a rule-piece more quickly and at the same time more perfectly than has heretofore been done, as it leaves the tongue of the tenon of a uniform thickness, and, as the inside cutter runs with the outside ones, the tenons must all be of an exact length.

It is composed simply of three thick saws, the inside one being as much less in diameter than the outside ones as the tenon is long. The mandrel is used in a perpendicular position, and the work is brought in contact with the cutters by the use of a table or carriage upon ways in the usual manner.

It has long been customary to make tenons with the use of two saws upon either a vertical or horizontal mandrel. The tenons on the end of the rule which holds the joint have always been made in this way, but in this case the length of the tenon might vary even one-sixteenth of an inch, and still answer all purposes; but in forming the tenon for the tip or cap of the rule the utmost precision must be had, or the end of the tenon will either be too long, and so keep the tip from forming a perfect joint at the shoulders, or it will be too short, and leave an open space at its end between it and the inner side of the tip.

The old way of making the tenon for the tips or caps was to put first on a horizontal mandrel a thick burr or mill of the same thickness that the tenon was to be wide, and next to the burr put a common circular saw. Then, by placing the rule on the carriage-bed and running it up, the saw cut off the end of the rule, while the burr cut the tenon on one side of the same, and to finish the operation the rule had to be turned over.

In my improved machine the rule is laid upon the carriage and pushed through the three saws on the vertical mandrel or arbor, and the work is complete and perfect. In the old way the tenon would vary with the thickness of the rule-piece, but in the improved way of making it the tenons are all of the same gage every way.

I do not claim the employment of two saws upon a vertical or horizontal arbor for forming the tenons to rule-pieces, as that is old; but

I claim—

The employment of a third or middle saw between the two, or its equivalent, which cuts the end of the tenon of the length required, in combination with the other two saws.

D. H. STEPHENS.

Witnesses:
 JAMES R. SMITH,
 CHAS. B. STEPHENS.